United States Patent [19]

French

[11] 4,164,383
[45] Aug. 14, 1979

[54] WATER WAVE ENERGY CONVERSION DEVICE USING FLEXIBLE MEMBRANES

[76] Inventor: Michael J. French, United Kindgom Atomic Energy Authority, 11 Charles II St., London, United Kingdom, S.W.1

[21] Appl. No.: 799,524

[22] Filed: May 23, 1977

[30] Foreign Application Priority Data

May 26, 1976 [GB] United Kingdom ............... 21768/76

[51] Int. Cl.² .............................................. F04B 35/00
[52] U.S. Cl. ...................................... 417/330; 60/398; 290/53
[58] Field of Search ................. 60/398, 502, 504, 505; 61/20; 290/42, 53, 40; 417/100, 330; 185/33

[56] References Cited

U.S. PATENT DOCUMENTS

| 1,791,239 | 2/1931 | Braselton ............................. 417/100 |
| 3,353,787 | 11/1967 | Semo ..................................... 60/398 |
| 3,961,863 | 6/1976 | Hooper ............................... 290/42 X |
| 3,989,951 | 11/1976 | Lesster et al. ................... 417/330 X |

*Primary Examiner*—Edgar W. Geoghegan
*Attorney, Agent, or Firm*—Larson, Taylor and Hinds

[57] ABSTRACT

A device for conversion of sea wave energy comprises partially inflated bag-like enclosures formed from flexible impermeable material. The enclosures are connected via non return valves to a high pressure conduit and a low pressure return conduit so as to act as an air pump or bellows as the sea rises and falls around the enclosures. A turbine extracts energy from the high pressure conduit, the exhaust returning to the low pressure return conduit.

3 Claims, 13 Drawing Figures

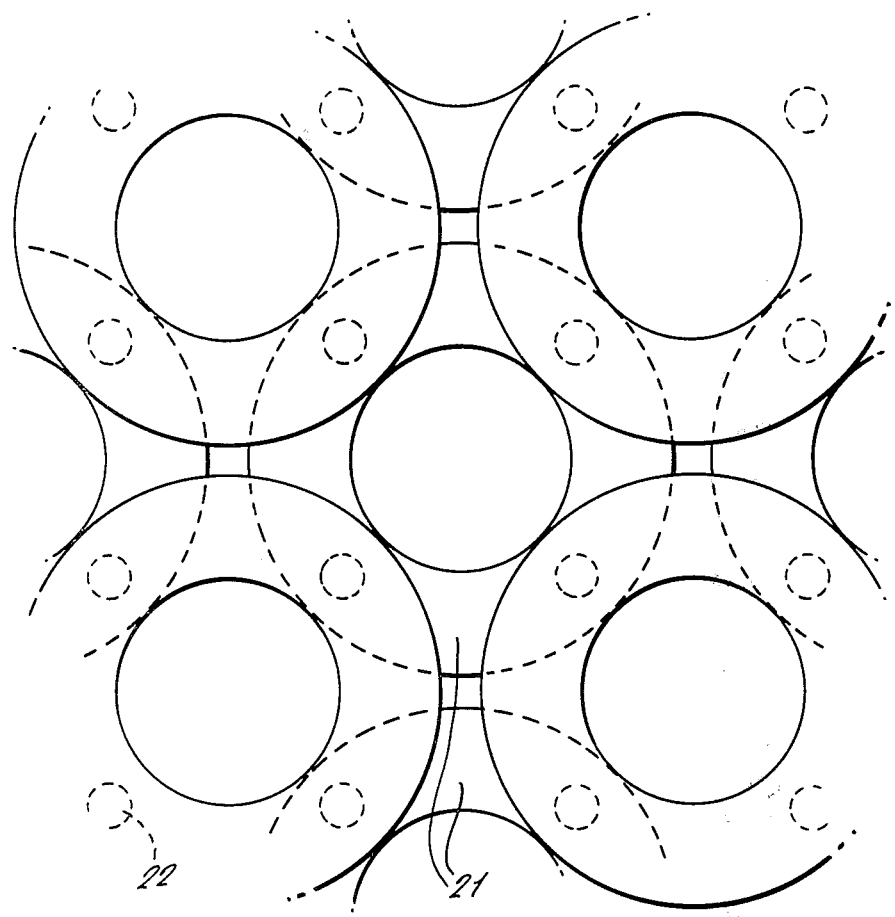

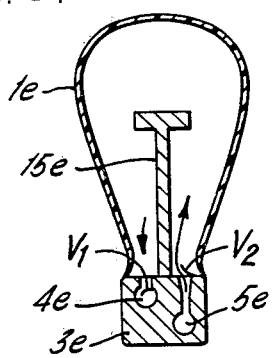
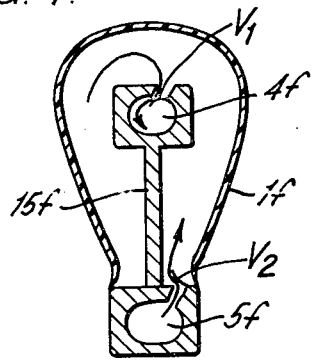
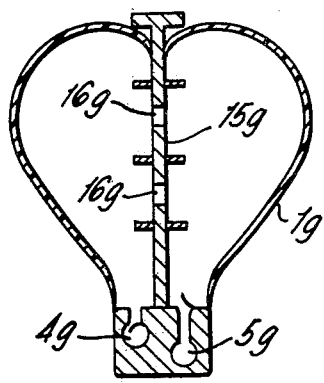
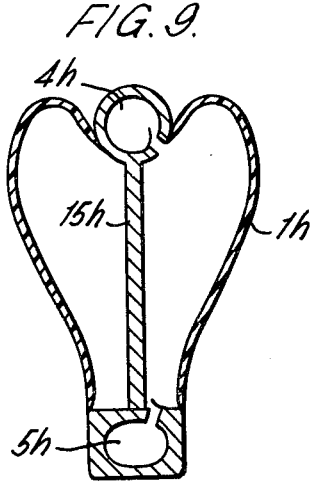
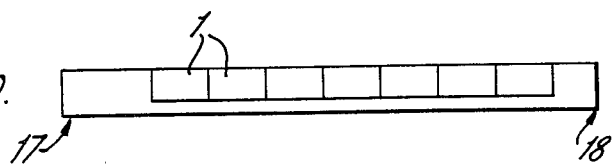
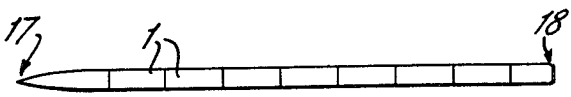

WATER WAVE ENERGY CONVERSION DEVICE USING FLEXIBLE MEMBRANES

BACKGROUND OF THE INVENTION

The invention relates to a flexible membrane device for the conversion, for example to electricity, of the energy of water surface waves and is intended, in particular, for use in extracting energy from waves on the surface of the sea.

SUMMARY OF THE INVENTION

The invention provides a device for conversion of energy from water waves comprising an enclosure having a flexible wall of impermeable material, the enclosure containing gas and adapted for location in water at or just below the surface, an outgoing gas passageway and a return gas passageway communicating with the enclosure via non-return valves arranged to permit one way gas flow from the enclosure into the outgoing gas passageway and to permit one way gas flow from the return gas passageway into the enclosure, whereby in operation pressure imparted via the flexible wall of the enclosure to the gas within the enclosure by the passage of a water wave crest forces gas into the outgoing gas passageway and, correspondingly, as gas pressure in the enclosure falls with the passage of a water wave trough, gas is returned into the enclosure from the return gas passageway.

Preferably the enclosure is in the form of an air vessel or bag formed from plastic coated cloth or like flexible impervious material.

In one arrangement according to the invention gas in the outgoing passageway flows into the return passageway via a turbine.

The invention includes a device as aforesaid interconnected with one or more other such devices.

The invention also provides a device for conversion of energy from water waves comprising an elongated flexible enclosure of impermeable material divided into compartments each containing gas, a high pressure gas conduit and a low pressure gas conduit, each compartment being connected to the gas conduits via non return valves arranged to permit one way passage of gas from the compartment into the high pressure gas conduit and to permit one way passage of gas from the low pressure gas conduit into the compartment, the device being adapted for location in water at or just below the surface so that as water waves pass along the device each compartment is subjected in turn to an external pressure alternation, gas being pumped when the external pressure is high from the compartment into the high pressure gas conduit and gas returning, when the external pressure is low, from the low pressure gas conduit into the compartment.

BRIEF DESCRIPTION OF THE DRAWINGS

Specific constructions of device embodying the invention will now be described by way of example and with reference to the accompanying drawings, in which:

FIG. 1b is a diagrammatic sectional view of the device of FIG. 1a;

FIG. 5 is a diagrammatic plan view of another device;

FIGS. 6 to 9 are diagrammatic sectional views, similar to FIG. 1b, showing various possible modifications of the device of FIG. 1a; and FIGS. 10 and 11 are highly diagrammatic side and plan views respectively of the device, to show end configuration.

DESCRIPTION OF PREFERRED EMBODIMENTS

Figure 1A:
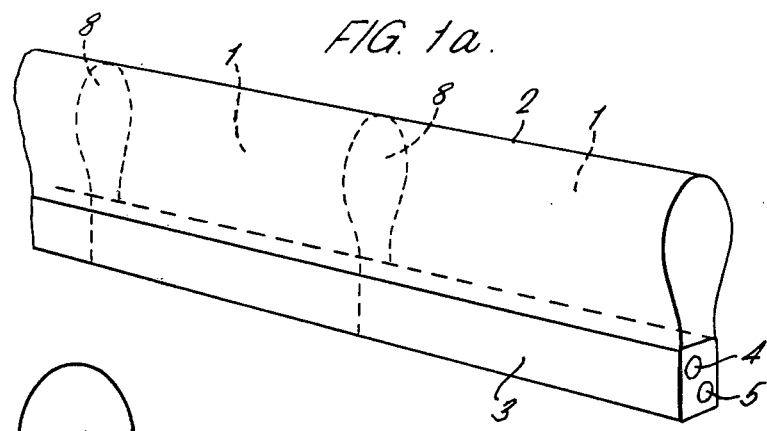
FIG. 1a is a diagrammatic perspective view, partly broken away of part of a device.

Referring to FIG. 1, the device of this example comprises an elongated flexible enclosure formed from a long strip of plastic coated cloth, or similar flexible, impervious material 2, folded double and attached at its free lower edges to a beam 3. The tube so formed is divided into separate compartments or vessels 1 by divisions 8 of the same material as 2. In this example, the overall depth of the tube is about 4 m, the length of each vessel about 5 m, and the length of the beam 3 about 200 m.

The beam 3 has formed in it two conduits or channels 4 and 5 which extend along the length of the beam 3. Each vessel 1 communicates with the conduit 4 and 5 via passages 6 and 7 which contain non-return valves indicated at $V_1$ and $V_2$, respectively (see also FIGS. 6 and 7). The valve $V_1$ in passage 6 permits one way air flow from the vessel 1 into the conduit 4 and the valve $V_2$ in passage 7 permits one way air flow from the conduit 5 into the vessel 1. Arrows indicating the direction of flow are provided in FIGS. 1b, 6 and 7. A turbine 13 (see FIGS. 2 and 3), or similar work-producing expander, is connected between conduit 4 and the return conduit 5.

In operation, the enclosure is partially inflated with air and the device moored in the sea with the beam 3 normally submerged and the vessels 1 just breaking the surface. Ideally the length of the device is aligned with the direction of advance of waves on the sea. As the waves pass along the device, each vessel 1 will in turn be subjected to compression as wave crests pass and reduced pressure as wave troughs pass. As a vessel 1 is compressed gas is forced into the conduit 4. As external pressure on the vessel 1 reduces with the passage of a wave trough, air returns to the vessel 1 from the return conduit 5. The vessels 1 thus function as air pumps or bellows as the sea rises and falls around them and the conduits 4 and 5 act respectively as high and low pressure air mains —the term "high" being purely relative since it will be only about 1 meter of water pressure higher than "low".

The air pressure difference generated by this function of the vessels 1 in the sea is exploited in this example by driving a turbine from the high pressure conduit 4, the exhaust returning to the low pressure return conduit 5. The length of the beam 3 is sufficient to ensure that the rate of delivery of air into the conduit 4 and the rate of extraction of air from the conduit 5 are reasonably steady so as to be suitable for turbine operation.

It will be appreciated from the foregoing description and from the drawings that the configuration described permits collapse of a vessel, when outside pressure exceeds the internal pressure in the low pressure air main, by lateral movement of the side walls of the flexible enclosure.

Clearly it is most convenient for the vessels 1 to contain air, but any other gas would be suitable. The device could also operate with liquid of lower density than water in the vessels 1, but this is unlikely to be satisfactory since the operation of the device depends upon the fluid medium in the vessels having sufficiently low density relative to water to provide rapid volume movement under the pressure differentials applied by the water waves. Otherwise, much of the water wave energy is taken up in overcoming the inertia of the fluid medium within the vessels.

Figure 2:
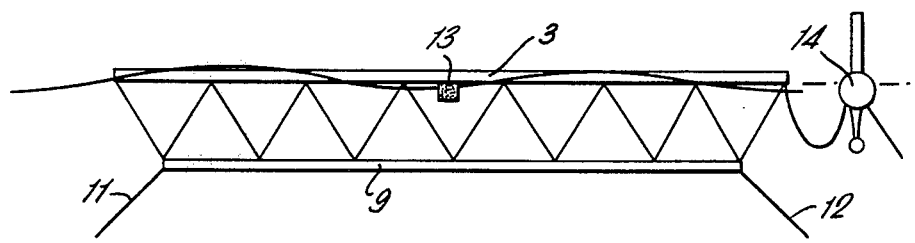
FIG. 2 is a diagrammatic side elevation of the device.
Figure 3:
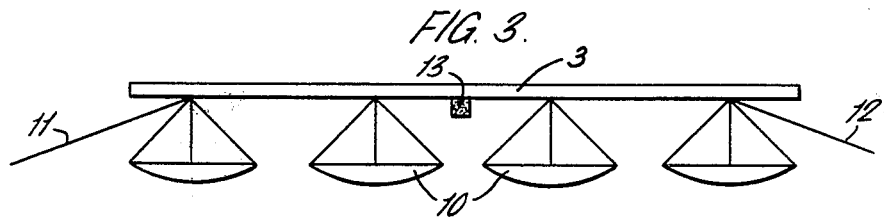
FIG. 3 is a diagrammatic side elevation of a modified device.

It is important for the beam 3 to have stiffness against vertical flexing, otherwise the beam may follow the surface wave undulations and conversion efficiency will be reduced. FIG. 2 illustrates one arrangement for stiffening the beam 3, by making it the top chord of a truss 9. FIG. 3 illustrates an alternative in which the beam 3 is relatively flexible but is restrained from following the motions of the surface by large drogues 10.

Figure 4A:
FIGS. 4a and 4b illustrate alignment of a plurality of devices relative to wave direction.

In a preferred arrangement, a number of beams 3 are aligned along the direction of the wave motion (arrow W), so that the waves run along them as illustrated in FIG. 4a. As the waves pass down a channel between two beams the flexible walls move inwards towards the beam centrelines opposite a crest, which therefore tends to collapse, and outwards opposite a trough, which tends to fill. The effect is to reduce the height of the waves, perhaps to about 60% by the end of the channel, corresponding to an extraction of energy of about 64%.

Figure 4B:
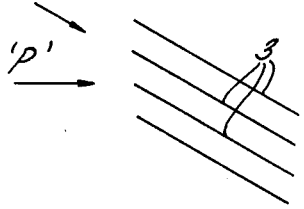

The beams are moored fore-and-aft by lines 11 and 12 in a moderate depth of water (say, 40 to 80 m), provision being made to adjust the inshore mooring to 'train' the beams to meet seas up to about 30° on either side of the prevailing direction (arrow P) as illustrated in FIG. 4b.

The beams 3 are normally submerged, with the vessels 1 breaking the surface. By means of a small airpump the inflation of the vessels can be changed by pumping in air from the atmosphere or allowing air to escape to the atmosphere. The air intake and exhaust are located in a spar buoy 14 (see FIG. 2) connected to the beam by a flexible pipe so that in storms the beam may be sunk below the surface to protect it from damage.

It is an important feature of the preferred arrangement of the invention referred to above that the vessel-bearing beams 3 are aligned perpendicular to the wave crests, so that the action of the seas on them is relatively gentle compared with that on devices lying parallel to the wave crests.

Figure 1B:
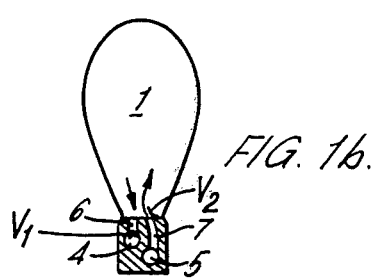

FIGS. 6 to 9 illustrate a number of possible modifications of the device shown in FIGS. 1a and 1b. The principles of operation are the same and similar components are referenced with the same reference numerals as FIGS. 1a and 1b, but distinguished by suffix letters e, f, g and h.

A common feature of the examples of FIGS. 6 to 9 are the provision of a beam or truss 15 with resistance to vertical flexing in which depth of section, without overall increase in depth of the device is achieved by extending the beam or truss into the flexible vessels 1. Further, the arrangement of these examples provides for partial or complete protection of the beam components from contact with sea water—an important feature for reducing corrosion of the beam.

In FIGS. 7 and 9 one conduit 4f and 4h respectively is in one chord of the truss 15f and 15h and the other conduit 5f and 5h respectively is in the other chord of the truss 15f and 15h. In FIG. 9, the conduit 4h is outside and on top of the vessels 1h. With this general configuration and provided conduit 4h is the high pressure conduit, it is possible for this conduit 4h to be provided by flexible material similar to that of the vessels 1h.

In FIG. 8, the I-beam 15g extends right through the vessels 1g and holes 16g ensure communication between the two halves of each of the vessels 1g.

FIGS. 10 and 11 illustrate provision on the device of boat shaped ends in the form of bow 17 and stern 18. These provide a rigid wave breasting action and contain buoyancy chambers to permit modification of the pitching frequency and to improve stability. It is to be noted that similar effects (modification of pitching frequency and improved stability) result from the FIG. 9 arrangement with the conduit 4 at the top.

The arrangements and operation of the foregoing examples illustrate operation with parallel connection of each of the vessels 1 to the outgoing and return gas conduits 4 and 5. It is possible for the vessels 1 to be connected in series so that there is a build up of gas pressure from one end of the device to the other. Such a mode of operation would require that the device is mounted with a predetermined slope relative to the mean water surface. The optimum slope depends upon the water wave-length and a practical difficulty is to achieve a slope which will operate satisfactorily with the long wave-length waves which will be typical of most suitable sea sites.

A torodial form of vessel 21 coupled via non return valves 22 in series and arranged in a draughtboard pattern in several layers is illustrated in FIG. 5. However, the linear form of FIG. 1 is preferred for waves of long period.

I claim:

1. A device for conversion of energy from water waves comprising an elongated flexible enclosure of impermeable material divided into compartments each containing gas, a high pressure gas conduit and a low pressure gas conduit, means for connecting each compartment to the gas conduits through non-return valves arranged to permit one way passage of gas from the compartment into the high pressure gas conduit and to permit one way passage of gas from the low pressure gas conduit into the compartment, a rigid elongated support structure to which the flexible enclosure material is attached with the enclosure extending upwards, in operation, from the line of attachment thereof to the rigid support with at least one side wall of the enclosure being free to flex laterally, the device being located for operation in water with the top of the flexible enclosure at or just below the surface such that each compartment is subjected in turn to an external pressure alternation as water waves pass along the device, and the pressures in the gases in the high pressure gas conduit and the low pressure gas conduit being respectively such that, for operation in response to the said external pressure alternation, gas is pumped when the external pressure is high from the compartment into the high pressure gas conduit by lateral collapse of the compartment and gas is pumped when external pressure is low from the low pressure gas conduit into the compartment.

2. A device as claimed in claim 1, wherein the rigid support comprises a beam in the interior of which are formed the high and low pressure gas conduits.

3. A device as claimed in claim 2, wherein the beam has a generally I-section form and at least part of the beam extends into the interior of the flexible enclosure.

* * * * *